United States Patent
Butts et al.

(10) Patent No.: US 12,523,021 B2
(45) Date of Patent: Jan. 13, 2026

(54) INDUSTRIAL HYDRANT

(71) Applicant: AMERICAN Cast Iron Pipe Company, Birmingham, AL (US)

(72) Inventors: Jeffrey William Butts, Veedersburg, IN (US); Paul Donald Burgeson, Brownsburg, IN (US); Derek B. Scott, Pace, FL (US); Robert A Dyer, Crawfordsville, IN (US)

(73) Assignee: AMERICAN Cast Iron Pipe Company, Birmingham, AL (US)

( * ) Notice: Subject to any disclaimer, the term of this patent is extended or adjusted under 35 U.S.C. 154(b) by 0 days.

(21) Appl. No.: 18/537,382

(22) Filed: Dec. 12, 2023

(65) Prior Publication Data

US 2025/0188718 A1 Jun. 12, 2025

(51) Int. Cl.
  *E03B 9/04* (2006.01)
  *E03B 9/14* (2006.01)
  *F16K 27/00* (2006.01)

(52) U.S. Cl.
  CPC .................. *E03B 9/04* (2013.01); *E03B 9/14* (2013.01); *F16K 27/006* (2013.01)

(58) Field of Classification Search
  CPC ....... E03B 9/02; E03B 9/04–14; F16K 27/006
  USPC ....... 137/291, 300, 272, 280, 286, 287, 288, 137/304, 307
  See application file for complete search history.

(56) References Cited

U.S. PATENT DOCUMENTS

| | | | | |
|---|---|---|---|---|
| 33,239 A | * | 9/1861 | Cregier | E03B 9/16 137/300 |
| 164,149 A | * | 6/1875 | Cregier | E03B 9/16 137/305 |
| 164,856 A | * | 6/1875 | McMillan | E03B 9/02 137/280 |
| 173,768 A | * | 2/1876 | Cregier | E03B 9/02 119/72 |
| 402,115 A | * | 4/1889 | Tyler | E03B 9/02 137/305 |
| 795,057 A | * | 7/1905 | O'Brien | E03B 9/02 137/305 |
| 978,385 A | * | 12/1910 | Lofton | E03B 9/04 137/289 |
| 990,989 A | * | 5/1911 | Knickerbacker | E03B 9/02 137/305 |
| 1,083,307 A | * | 1/1914 | Thorne | E03B 9/04 137/283 |
| 1,605,011 A | * | 11/1926 | Storey | E03B 9/14 119/74 |

(Continued)

*Primary Examiner* — Kenneth Rinehart
*Assistant Examiner* — Jonathan J. Waddy
(74) *Attorney, Agent, or Firm* — Woodard, Emhardt, Henry, Reeves & Wagner, LLP

(57) ABSTRACT

The present invention is provide an industrial hydrant comprising an inlet operatively connected to a hydrant body. An inlet valve is in fluid communication with the inlet. A valve guiding is operatively connected to the inlet valve. A main valve within the inlet valve has a main valve outer diameter greater than six inches. The main valve is operatively connected to the valve guiding. A pilot valve within the inlet valve is operatively connected to the main valve and the valve guiding. The pilot valve has a pilot valve outer diameter that is less than the main valve outer diameter.

10 Claims, 4 Drawing Sheets

(56) References Cited

U.S. PATENT DOCUMENTS

| | | | | |
|---|---|---|---|---|
| 1,605,624 A | * | 11/1926 | Storey | E03B 9/14 |
| | | | | 137/307 |
| 1,674,074 A | * | 6/1928 | Turner | F16K 1/02 |
| | | | | 251/217 |
| 1,882,299 A | * | 10/1932 | Pilcher | E03B 9/14 |
| | | | | 137/306 |
| 2,019,515 A | * | 11/1935 | Waterous | E03B 9/14 |
| | | | | 137/302 |
| 3,249,332 A | * | 5/1966 | Hopkinson | E03B 9/02 |
| | | | | 251/363 |
| 3,298,390 A | | 1/1967 | Graaf | |
| 3,599,662 A | * | 8/1971 | Dashner | E03B 9/14 |
| | | | | 137/625.26 |
| 3,785,399 A | * | 1/1974 | Daigle | F16K 27/006 |
| | | | | 137/305 |
| 3,961,642 A | * | 6/1976 | Thomas | E03B 9/04 |
| | | | | 403/312 |
| 3,971,405 A | | 7/1976 | Millar et al. | |
| 4,793,557 A | * | 12/1988 | Marchese | A62C 31/24 |
| | | | | 239/587.3 |
| 4,821,762 A | * | 4/1989 | Breneman | E03B 7/10 |
| | | | | 137/454.2 |
| 6,058,957 A | * | 5/2000 | Honigsbaum | F16K 35/022 |
| | | | | 137/272 |
| 7,780,013 B1 | * | 8/2010 | Kern | E03B 9/16 |
| | | | | 137/550 |
| 11,186,971 B1 | * | 11/2021 | Allen | F16K 39/024 |
| 2008/0011975 A1 | * | 1/2008 | Robison | F16K 25/005 |
| | | | | 251/366 |
| 2013/0042924 A1 | * | 2/2013 | Montague | E03C 1/104 |
| | | | | 137/299 |
| 2013/0248009 A1 | * | 9/2013 | Williams | E03B 9/04 |
| | | | | 137/294 |
| 2015/0376876 A1 | * | 12/2015 | Kennedy | E03B 9/14 |
| | | | | 137/302 |
| 2016/0101307 A1 | * | 4/2016 | Montague | E03B 9/14 |
| | | | | 137/287 |
| 2017/0130431 A1 | * | 5/2017 | Pinney | E03B 9/02 |

* cited by examiner

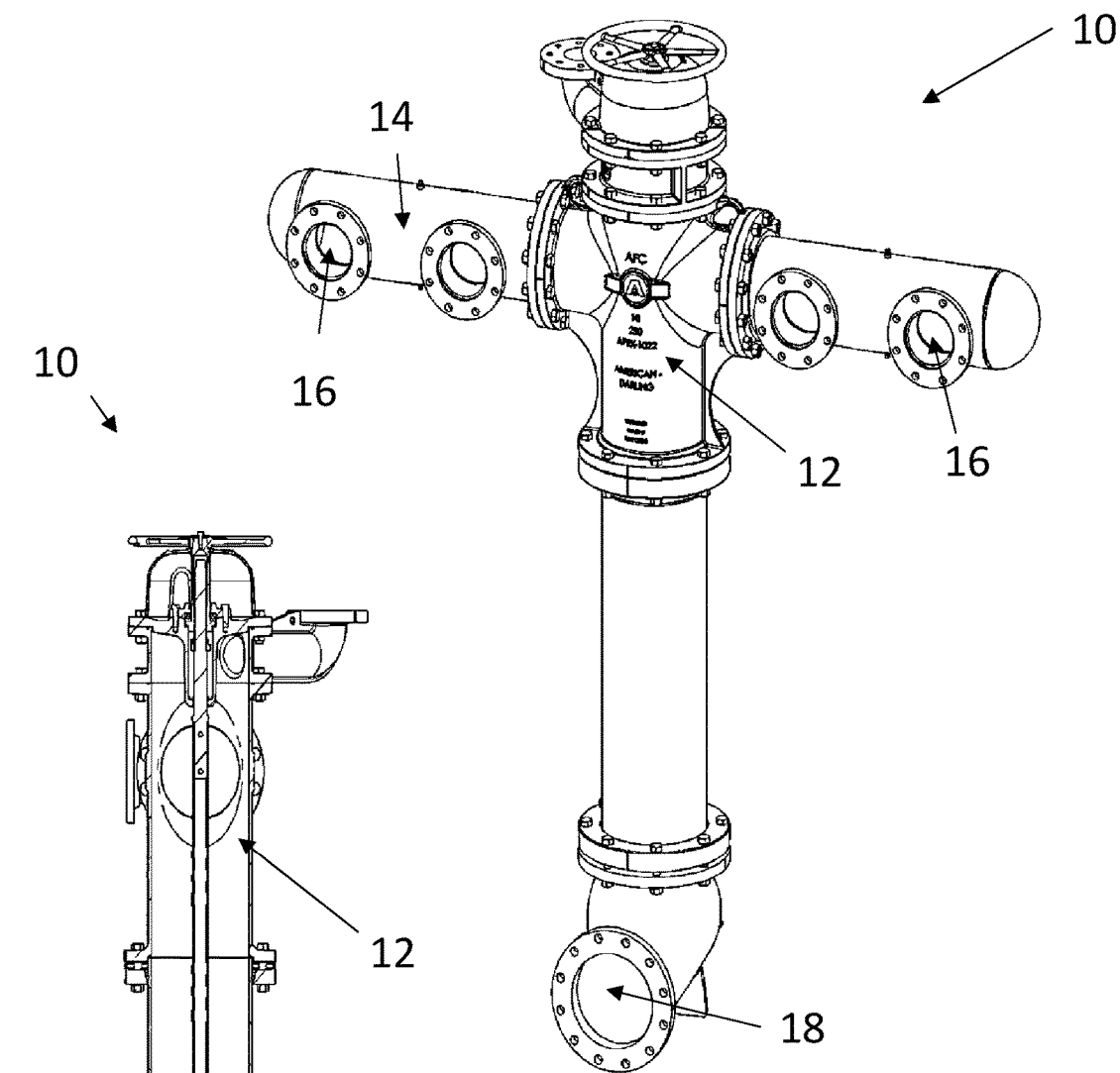
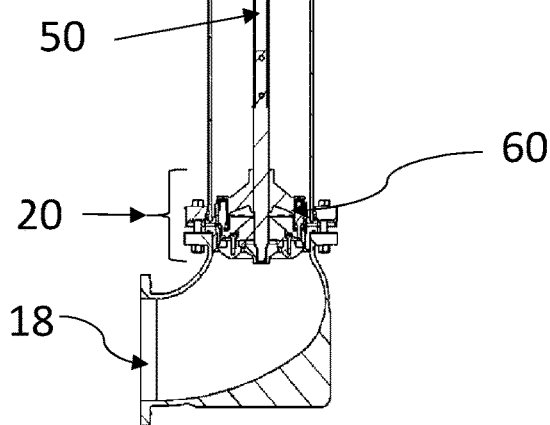
FIG. 1A
FIG. 1B

INDUSTRIAL HYDRANT

FIELD OF THE INVENTION

The invention relates to industrial hydrants having industrial manifolds for industrial fire fighting at plants and facilities, and in particular to a high volume flow industrial hydrant manifold.

BACKGROUND OF THE INVENTION

Fire field logistics present problems that rank nearly as high as equipment-on-hand problems and personnel-available problems when facing an industrial fire fighting response.

Large fires at industrial facilities, e.g., refineries, petrochemical facilities, paper mills, etc. require large volumes of water which sometimes require multiple large diameter water supply hoses of six inches in diameter and larger. The most convenient, reliable, and safest means of distributing large volumes of water over an entire facility is through constructing underground water delivery systems with aboveground hydrant manifolds. These hydrant manifolds are used in conjunction with large diameter water supply hose to supply the necessary water to pumps, trucks, fire fighting nozzles and foam proportioning equipment.

In current practice, the hydrants used in industrial settings are too small in that the valve openings are six inches or less. Further, the increased water flow demand from the hydrant causes excessive chattering with can lead to the leak and/or failure of the hydrant.

In current practice, the manifolds used in industrial settings are controlled by valves installed at or above ground level. This makes the manifold susceptible to damage, leaking and/or failure of the manifold. To avoid this, manifolds require pumping of the manifold body after each use.

Therefore, it is an object of the present invention to provide an improvement which overcomes the inadequacies of the prior art methods and devices and which is a significant contribution to the advancement of industrial fire fighting.

Another object of the present invention is to provide an industrial hydrant comprising a hydrant body; an inlet operatively connected to the hydrant body; an inlet valve in fluid communication with the inlet; a valve guiding operatively connected to the inlet valve; a main valve within the inlet valve, the main valve having a main valve outer diameter greater than six inches, the main valve operatively connected to the valve guiding; and a pilot valve within the inlet valve, the pilot valve operatively connected to the main valve and the valve guiding.

Yet another object of the present invention is to provide an industrial hydrant comprising a hydrant body; an inlet operatively connected to the hydrant body; an inlet valve in fluid communication with the inlet; a valve guiding operatively connected to the inlet valve; a main valve within the inlet valve, the main valve having a main valve outer diameter greater than six inches, the main valve operatively connected to the valve guiding; and a drain within the inlet valve, the drain is operatively connected to the valve guiding.

Still yet another object of the present invention is to provide an industrial hydrant comprising a hydrant body; an inlet operatively connected to the hydrant body; an inlet valve in fluid communication with the inlet; a valve guiding operatively connected to the inlet valve; a main valve within the inlet valve, the main valve having a main valve outer diameter greater than six inches, the main valve operatively connected to the valve guiding; a pilot valve within the inlet valve, the pilot valve operatively connected to the main valve and the valve guiding, the pilot valve having a pilot valve outer diameter, the pilot valve outer diameter is less than the main valve outer diameter.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

A feature of the present invention is to provide an industrial hydrant comprising a hydrant body that is operatively connected to an inlet. An inlet valve is in fluid communication with the inlet. A valve guiding is operatively connected to the inlet valve. A main valve within the inlet valve has a main valve outer diameter greater than six inches. The outer diameter of the main valve can be at least ten inches. The main valve is operatively connected to the valve guiding. A pilot valve within the inlet valve is operatively connected to the main valve and the valve guiding. The pilot valve can have a pilot valve outer diameter that is less than the main valve outer diameter. The industrial hydrant can further comprise a drain within the inlet valve wherein the drain is operatively connected to the valve guiding. The industrial hydrant can further comprise a dual drain system within the inlet valve. The industrial hydrant can further comprise at least two manifolds extending from the hydrant body. The industrial hydrant can further comprise a seal between the main valve and the pilot valve within the inlet valve. The industrial hydrant can further comprise a monitor mount in communication with the hydrant body.

Another feature of the present invention is to provide an industrial hydrant comprising a hydrant body that is operatively connected to an inlet. An inlet valve is in fluid communication with the inlet. A valve guiding is operatively connected to the inlet valve. A main valve within the inlet valve has a main valve outer diameter greater than six inches. The outer diameter of the main valve can be at least ten inches. The main valve is operatively connected to the valve guiding. A drain within the inlet valve is operatively connected to the valve guiding. The industrial hydrant can further comprise a dual drain system within the inlet valve. The industrial hydrant can further comprise at least two manifolds extending from the hydrant body. The industrial hydrant can further comprise a seal between the main valve and the pilot valve within the inlet valve. The industrial hydrant can further comprise a monitor mount in communication with the hydrant body.

Yet another feature of the present invention is to provide an industrial hydrant comprising a hydrant body that is operatively connected to an inlet. An inlet valve is in fluid communication with the inlet. A valve guiding is operatively connected to the inlet valve. A main valve within the inlet valve has a main valve outer diameter greater than six inches. The outer diameter of the main valve can be at least ten inches. The main valve is operatively connected to the valve guiding. A pilot valve within the inlet valve is operatively connected to the main valve and the valve guiding. The pilot valve has a pilot valve outer diameter that is less than the main valve outer diameter. The industrial hydrant can further comprise at least two manifolds extending from the hydrant body. The industrial hydrant can further comprise a seal between the main valve and the pilot valve within the inlet valve. The industrial hydrant can further comprise a monitor mount in communication with the hydrant body.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 1A is a perspective view of one embodiment of the present invention;

FIG. 1B is a side schematic view of one embodiment of the present invention;

Similar reference characters refer to similar parts throughout the several views of the drawings.

DETAILED DESCRIPTION OF THE INVENTION

Figures 2A, 2B:
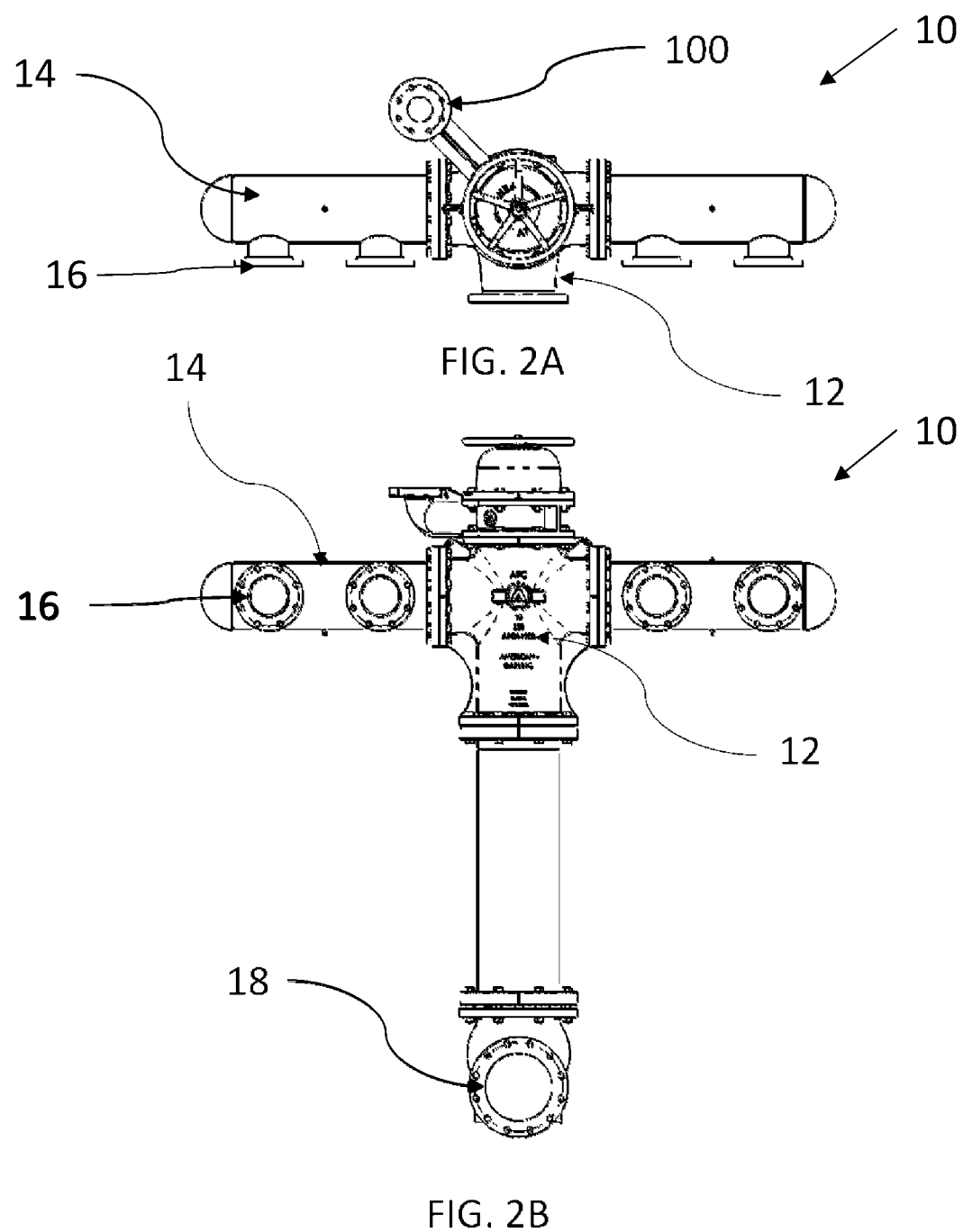
FIG. 2A is a top schematic view of one embodiment of the present invention.
FIG. 2B is a front schematic view of one embodiment of the present invention.

The present invention is an improved industrial hydrant 10 that reduces chattering when opening the flow of water of a hydrant where the hydrant has a large inlet opening and is part of a manifold system. As shown in FIG. 1A, an industrial hydrant 10 comprising a large inlet 18 that allows water to flow to an inlet valve 20 within a hydrant body 12 that is in fluid communication with the inlet 18. Typically, the inlet 18 is below ground. Whereas, the hydrant body 12 is mounted at ground level. The hydrant body 12 can have adjustable manifolds 14 extending in one or multiple directions. The manifolds 14 can have one or more outlets 16 for hooking up hoses (not shown) to deliver water to the desired location, e.g., a fire.

As shown in FIG. 1B, a valve guiding 50 is provided within the hydrant body 12. A drain 60 within the inlet valve 20 is operatively connected to the valve guiding 50. The industrial hydrant can further comprise a dual drain system within the inlet valve 20.

As shown in FIG. 2A, an industrial hydrant 10 can have adjustable manifolds 14 extending in one or multiple directions. The manifolds 14 can have one or more outlets 16 for hooking up hoses (not shown) to deliver water to the desired location, e.g., a fire. In addition a monitor mount system 100 for guiding open water flows can be mounted to the hydrant body 12.

As shown in FIG. 2B, an industrial hydrant 10 comprising a large inlet 18 that allows water to flow to an inlet valve 20 within a hydrant body 12 that is in fluid communication with the inlet 18. Typically, the inlet 18 is below ground. Whereas, the hydrant body 12 is mounted at ground level. The hydrant body 12 can have adjustable manifolds 14 extending in one or multiple directions. The manifolds 14 can have one or more outlets 16 for hooking up hoses (not shown) to deliver water to the desired location, e.g., a fire.

Figure 3:
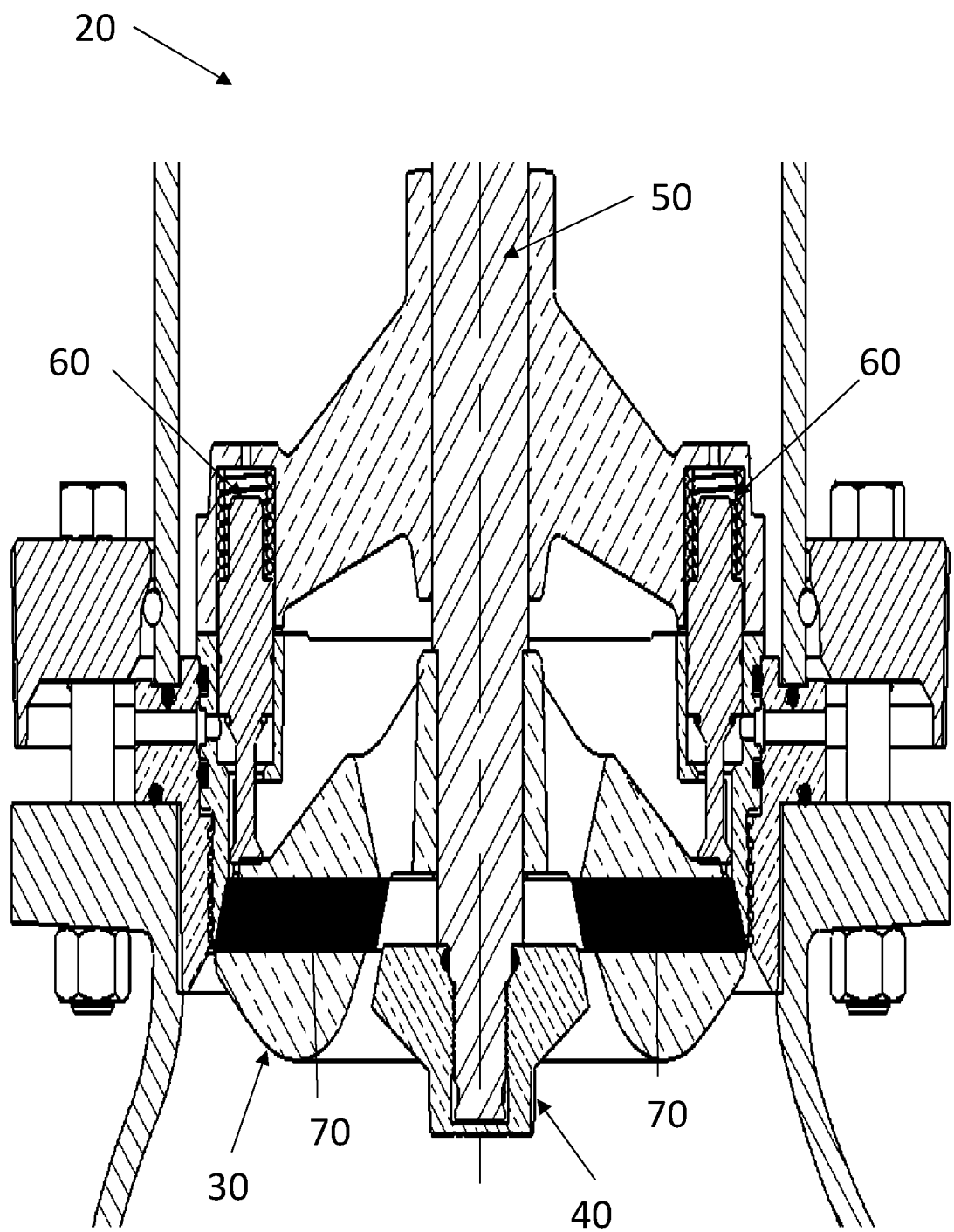
FIG. 3 is a blown up internal view of one embodiment of the present invention.

FIG. 3 is a blown up view of the inside of the inlet valve 20 of the present invention. A valve guiding 50 is operatively connected to the inlet valve 20 within the hydrant body 12. A main valve 30 within the inlet valve 20 has a main valve outer diameter greater than six inches. The main valve 30 operates to allow water to flow from the inlet valve 20 to any of the outlets. The outer diameter of the main valve 30 can be at least ten inches. The main valve 30 is operatively connected to the valve guiding 50. A pilot valve 40 within the inlet valve 20 is operatively connected to the main valve 30 and the valve guiding 50. The pilot valve 40 can have a pilot valve outer diameter that is less than the main valve outer diameter. A seal 70 can be provided between the main valve 30 and the pilot valve 40. As shown in FIG. 3, the main valve 30 and pilot valve 40 are in the closed position which prevents the flow of water from the inlet valve 20 to any of the outlets. In addition, drain system 60 can be provided within the inlet valve 20.

Figure 4:
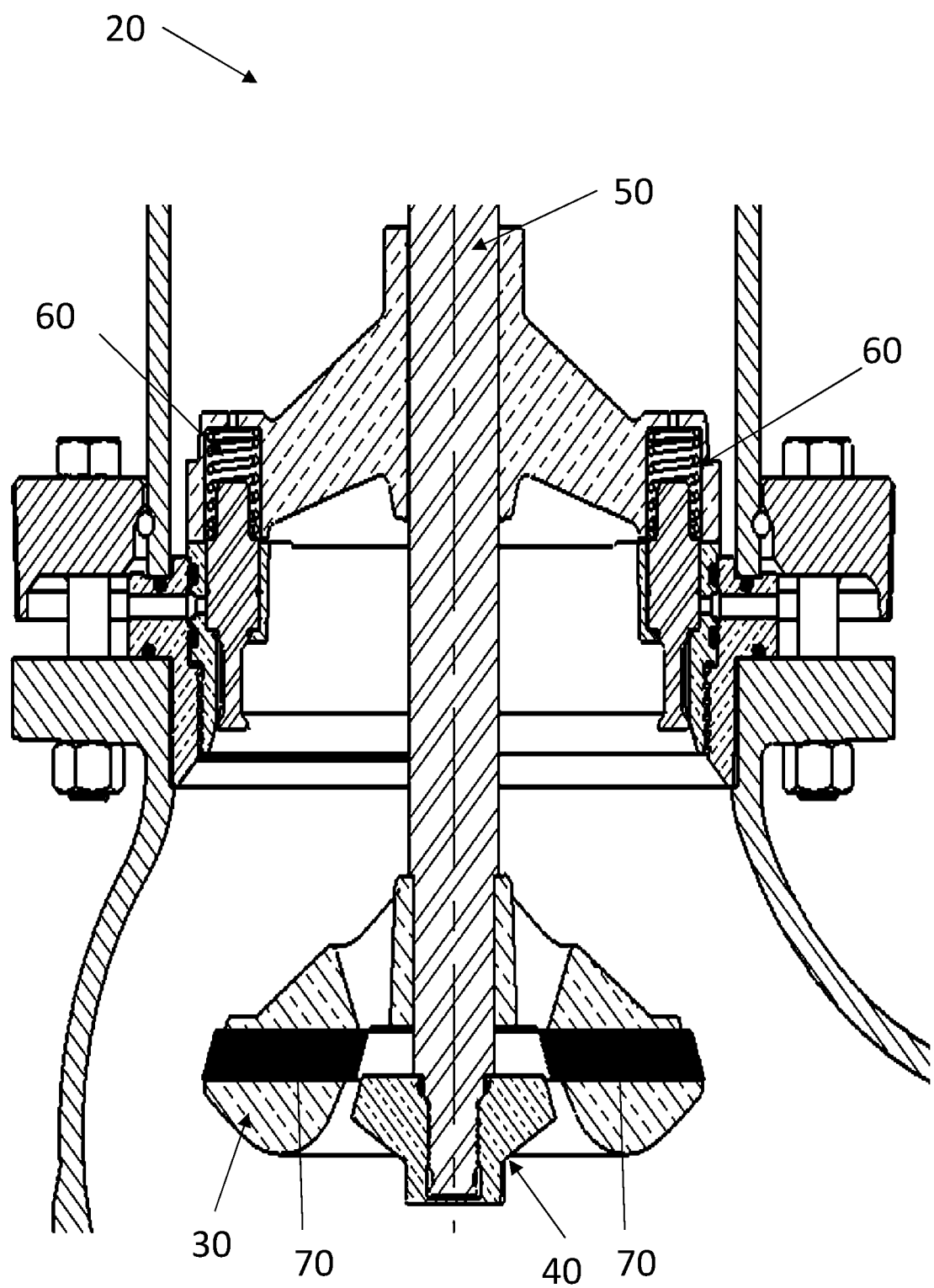
FIG. 4 is a blown up internal view of one embodiment of the present invention.

FIG. 4 is a blown up view of the inside of the inlet valve 20 of the present invention. A valve guiding 50 is operatively connected to the inlet valve 20 within the hydrant body. A main valve 30 within the inlet valve 20 has a main valve outer diameter greater than six inches. The main valve 30 operates to allow water to flow from the inlet valve 20 to any of the outlets. The outer diameter of the main valve 30 can be at least ten inches. The main valve 30 is operatively connected to the valve guiding 50. A pilot valve 40 within the inlet valve 20 is operatively connected to the main valve 30 and the valve guiding 50. The pilot valve 40 can have a pilot valve outer diameter that is less than the main valve outer diameter. A seal 70 can be provided between the main valve 30 and the pilot valve 40. As shown in FIG. 4, the main valve 30 and pilot valve 40 are in the open position which allows the flow of water from the inlet valve 20 to any of the outlets. In addition, drain system 60 can be provided within the inlet valve 20.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An industrial hydrant, comprising:
   a hydrant body;
   an inlet operatively connected to the hydrant body;
   an inlet valve in fluid communication with the inlet;
   a valve guide operatively connected to the inlet valve;
   a main valve within the inlet valve;
   a pilot valve within the inlet valve;
   wherein the valve guide is disposed at the inlet valve;
   a shaft braced by the valve guide;

wherein the shaft is coupled to the pilot valve;
wherein the shaft is coupled to the main valve;
wherein the main valve has a seal;
wherein the seal defines an opening;
wherein the pilot valve has a closed position and an opened position;
wherein the pilot valve is seated inside the opening of the seal to seal against the seal to prevent fluid flow when in the closed position;
wherein the pilot valve is unseated from the opening in the seal to allow the fluid flow through the opening in the seal when in the opened position;
wherein the inlet valve has a valve body;
wherein the seal has an outer periphery;
wherein the outer periphery of the seal seals against the valve body when the main valve is closed; and
wherein the outer periphery of the seal is unseated from the valve body to allow the fluid flow between the seal and the valve body when the main valve is opened.

2. The industrial hydrant according to claim 1 further comprising at least two manifolds extending from the hydrant body.

3. The industrial hydrant according to claim 2, further comprising a dual drain system within the inlet valve.

4. The industrial hydrant according to claim 3, wherein a main valve outer diameter is at least ten inches.

5. The industrial hydrant according to claim 4 further comprising a monitor mount in communication with the hydrant body.

6. The industrial hydrant according to claim 1, wherein:
the seal is positioned to seal the main valve and the pilot valve;
the shaft is configured to move the pilot valve between the opened position and the closed position; and
the shaft extends through the opening in the seal when in the opened position.

7. An industrial hydrant, comprising:
a hydrant body;
an inlet operatively connected to the hydrant body;
an inlet valve in fluid communication with the inlet;
a valve guide operatively connected to the inlet valve;
a main valve within the inlet valve;;
the main valve operatively connected to the valve guide;
a drain within the inlet valve;;
the drain is operatively connected to the valve guide;
a valve body defining at least two drain openings;
wherein the drain includes at least two drain valves;
wherein each drain valve is associated with a corresponding one of the drain openings; and
wherein each drain valve includes:
a drain valve body;
a spool slidably disposed in the drain valve body;
a valve spring disposed between the spool and the drain valve body;
wherein the spool has an opened position where the spool opens the corresponding drain opening;
wherein the spool has a closed position where the spool closes the corresponding drain opening; and
wherein the valve spring biases the spool to the closed position.

8. The industrial hydrant according to claim 7, further comprising at least two manifolds extending from the hydrant body.

9. The industrial hydrant according to claim 7, wherein a main valve outer diameter is at least ten inches.

10. The industrial hydrant according to claim 7, further comprising a monitor mount in communication with the hydrant body.

* * * * *